: US010536864B2

(12) United States Patent
Lelkens et al.

(10) Patent No.: US 10,536,864 B2
(45) Date of Patent: Jan. 14, 2020

(54) METHOD FOR MANAGING A NEIGHBOR TABLE AND COMMUNICATION APPARATUS ADAPTED FOR MANAGING A NEIGHBOR TABLE

(71) Applicant: SIGNIFY HOLDING B.V., Eindhoven (NL)

(72) Inventors: Armand Michel Marie Lelkens, Heerlen (NL); Xiangyu Wang, Eindhoven (NL); Rick Van Haasen, Eindhoven (NL); Zhizhong Zhang, Shanghai (CN); Peiliang Dong, Shanghai (CN); Rong Fan, Shanghai (CN)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/061,208

(22) PCT Filed: Dec. 7, 2016

(86) PCT No.: PCT/EP2016/080025
§ 371 (c)(1),
(2) Date: Jun. 11, 2018

(87) PCT Pub. No.: WO2017/102486
PCT Pub. Date: Jun. 22, 2017

(65) Prior Publication Data
US 2018/0359649 A1 Dec. 13, 2018

(30) Foreign Application Priority Data

Dec. 15, 2015 (EP) .................................. 15200131

(51) Int. Cl.
*H04W 24/02* (2009.01)
*H04W 40/12* (2009.01)
*H04W 84/18* (2009.01)

(52) U.S. Cl.
CPC .......... *H04W 24/02* (2013.01); *H04W 40/12* (2013.01); *H04W 84/18* (2013.01)

(58) Field of Classification Search
CPC ..... H04W 24/02; H04W 40/12; H04W 88/08; H04W 84/18
See application file for complete search history.

(56) References Cited

U.S. PATENT DOCUMENTS

2007/0043940 A1* 2/2007 Gustave .............. H04L 63/0272
713/150
2007/0274232 A1 11/2007 Axelsson et al.
(Continued)

*Primary Examiner* — Chi Ho A Lee
(74) *Attorney, Agent, or Firm* — Daniel J. Piotrowski

(57) ABSTRACT

The present invention is a method of managing a neighbor table in a communication apparatus. The method includes the steps of the communication apparatus maintaining a neighbor table comprising a plurality of neighboring table entries corresponding to respective neighboring nodes being communication nodes in communication range of the communication apparatus. Upon determination that the neighbor table capacity has reached a threshold, replacing a first neighbor table entry corresponding to a first neighboring node from the neighbor table by a new neighbor table entry corresponding to a new neighboring node based on the determination that the new neighboring node is a communication partner. A communication node is defined as a communication partner if at least one the following conditions is met: a message including the communication partner as source address has been received by the communication apparatus, or a message including the communication partner as destination address has been transmitted by the communication apparatus.

11 Claims, 3 Drawing Sheets

(56) References Cited

U.S. PATENT DOCUMENTS

| | | | |
|---|---|---|---|
| 2009/0003279 A1 | 1/2009 | Abusch-Magder | |
| 2009/0034419 A1* | 2/2009 | Flammer, III | H04L 45/124 |
| | | | 370/238 |
| 2009/0135824 A1* | 5/2009 | Liu | H04L 45/02 |
| | | | 370/392 |
| 2009/0327673 A1* | 12/2009 | Yoshimatsu | G06F 9/3806 |
| | | | 712/240 |
| 2010/0189107 A1* | 7/2010 | Corson | H04L 45/02 |
| | | | 370/392 |
| 2011/0170443 A1* | 7/2011 | Murias | H04W 40/28 |
| | | | 370/252 |
| 2012/0311072 A1* | 12/2012 | Huang | H04L 69/14 |
| | | | 709/217 |
| 2013/0215739 A1 | 8/2013 | Zhang | |
| 2014/0369359 A1* | 12/2014 | Kondo | H04W 40/28 |
| | | | 370/400 |
| 2016/0112311 A1* | 4/2016 | Vyas | H04L 45/74 |
| | | | 370/328 |
| 2017/0041845 A1* | 2/2017 | Ta | H04W 36/14 |
| 2018/0176853 A1* | 6/2018 | Chen | H04W 40/246 |
| 2018/0254971 A1* | 9/2018 | Thubert | H04L 45/02 |

* cited by examiner

METHOD FOR MANAGING A NEIGHBOR TABLE AND COMMUNICATION APPARATUS ADAPTED FOR MANAGING A NEIGHBOR TABLE

CROSS-REFERENCE TO PRIOR APPLICATIONS

This application is the U.S. National Phase application under 35 U.S.C. § 371 of International Application No. PCT/EP2016/080025, filed on Dec. 7, 2018 which claims the benefit of European Patent Application No. 15200131.9, filed on Dec. 15, 2015. These applications are hereby incorporated by reference herein.

FIELD OF THE INVENTION

The present invention relates to communication network and for example wireless communication networks including a plurality of communication apparatuses forming communication nodes of the network, in an example a lighting network.

BACKGROUND OF THE INVENTION

With the current trend for example in wireless lighting for buildings, the number of communication nodes in a network increases and it is not uncommon for example there are more than 500 luminaires on a single floor. This trend leads to very dense networks. In addition, the transmission range of modern radio chips is pretty satisfactory. For example, it is not uncommon to have radio chips of around 20-30 meters of transmission range for typical office indoor environment.

With such a transmission range, such a communication network can be characterized as dense electrical installations since there is typically a luminaire installed every 2-4 meters. As a result, in some networks, a communication apparatus can easily hear 100+ other communication nodes within one transmission range.

In order to optimize communication and the routing of data messages, a communication apparatus should keep track of the communication nodes that it can directly communicate with in a neighbour table (NBT). This neighbour table includes a plurality of neighbour table entries corresponding each respectively to a neighbouring node. A neighbouring node is a communication node that can be reached by a considered communication apparatus within a single communication hop.

However, to keep the cost of communication apparatus low, their radio units are typically resource constrained and especially memory is limited. Therefore, storing an exhaustive list in the neighbour table of all the communication nodes in the vicinity of the communication apparatus is not an option. Typically, the nodes that shall be incorporated into the neighbour table could be based on the link quality between the communication apparatus and the neighbouring nodes. However, this may be suboptimal from communication and network throughput point of view. Indeed, if only the neighbouring nodes exhibiting the best link quality are included in the neighbour table, these would typically be the closer communication nodes, and this would result in shorter hops, and a higher hop count for a considered route.

SUMMARY OF THE INVENTION

It is an object of the invention to alleviate the above identified problems.

It is another object of the invention to propose a method which optimizes the contents of a neighbour table to allow a more efficient routing in the communication network.

To this end, in accordance with a first aspect of the invention, it is proposed a method of managing a neighbour table in a communication apparatus the method comprising the steps of the communication apparatus maintaining a neighbour table comprising a plurality of neighbouring table entries corresponding to respective neighbouring nodes being communication nodes in communication range of the communication apparatus, said maintaining including, upon determination that the neighbour table capacity has reached a threshold, replacing a former neighbour table entry corresponding to a former neighbouring node from the neighbour table by a new neighbour table entry corresponding to a new neighbouring node based on the determination that the new neighbouring node is a communication partner, wherein a communication node is defined as a communication partner if at least one the following conditions is met:

condition a a message including the communication partner as source address has been received by the communication apparatus, or condition b a message including the communication partner as destination address has been transmitted by the communication apparatus, or condition c the new neighbouring node is defined as a communication partner by configuration.

Thus, the content of the neighbour table is optimized for the communication. The neighbour table entries corresponding to communication partners of the communication apparatus having higher priority than the other neighbour table entries, this allows that the routing of messages based on this neighbour table will preferentially have single hop routes. In a network where messages are relayed from communication node to communication node, this thus reduces the number of forwarding in the network, and thereby the interference of the system. Besides, as each forwarding of a data message has a probability of being lost, by reducing the number of forwarding, this reduces the number of lost packets, and requires less retransmissions, participating again in the reduction of the interference.

In accordance with an embodiment of the first aspect of the invention, the former neighbouring node is not a communication partner of the communication apparatus. Indeed, it is proposed in this embodiment that the neighbour table entries corresponding to communication partners have higher priority than neighbour table entries corresponding to other communication nodes when managing the neighbour table, an entry corresponding to a communication partner is preferred to an entry of a mere neighbour communication node.

In a variant of the first aspect of the invention, which can be combined with the previous embodiment, a link quality between the communication apparatus and said former neighboring node is lower that the link qualities of all the neighboring nodes corresponding to a neighbor table entry of the neighbor table and not being a communication partner of the communication node. This allows to maintain only the neighbour table entries corresponding to neighbour communication nodes having the best link quality, by removing the lowest link quality neighbour table entries first when doing some neighbour table entry replacement.

In another embodiment of the invention, the former neighboring node is either not a communication partner of the communication apparatus or is a communication partner with a link quality between the communication apparatus and said former neighboring node being lower than a link quality between the communication apparatus and the new neighboring node. Thus, in this example, a neighbour table entry is removed or replaced if this corresponds to a communication node that is not a communication partner, or if there are only communication partners listed in the neighbour table, and if the link quality associated with this communication node is lower than the link qualities of the other communication partners. This enables to keep only the best communication partners (the more reliable) should the neighbour table be only filled with communication partners.

In all the above variants of the invention, it may be beneficial that, in condition a, said message includes as destination address the communication apparatus, and in condition b, said message includes as source address the communication apparatus. Thus, the definition of the communication partner would be limited to the case of single hop route, i.e. the source node and the destination node can reach each other directly. This enables to reduce further the interference as explained above.

In an example of the invention, the meaning of source address of the source can be viewed at the network layer, not at the data link layer. This enables to differentiate between the real source of the message (at the network layer) and not the forwarding node (or previous hop at the data link layer). Similarly, the meaning of the destination address of the destination node can be viewed at the network layer, not at the data link layer, to differentiate between the final destination of the message (at the network layer) and not the next forwarder on the route (or next hop at the data link layer).

In all the above variants of the invention, condition c may include preconfiguration at installation or configuration during network operation by a network controller. This preconfiguration may be carried out so that during operation, the communication partners do not need to learn, their identifier is already stored in the communication apparatus. Then, when the communication apparatus discovers that a communication partner is in its vicinity, it is automatically added to the neighbour table, causing replacement of another entry in case the neighbour table is full. Similarly, a communication partner list may be distributed in the network during operation.

In another variant of the first aspect of the invention which can be combined with the previous examples, the method further comprises determining that the expiry of a validity period of an expired neighbor table entry, and deleting said expired neighbor table entry unless said expired neighbor table corresponds to a communication partner. Thus, a neighbour table entry that is for example unused for some time (or not revalidated by any other process), will be deleted if it is not an entry corresponding to a communication partner. This enables to free some space in the neighbour table while still preserving the communication partner.

In the previous variant, the communication apparatus may keep the expired neighbor table entry of a communication partner in the neighbor table with a flag indicative that the communication partner is unreachable. Thus, an entry corresponding to a communication partner but which stays unused for some time is maintained in the neighbour table.

In an example with the previous embodiment, upon reception of an incoming message from a first communication partner flagged as unreachable, the communication apparatus updates the value of the neighbour table entry corresponding to the first communication partner by removing said flag so that the neighbour table entry is reactivated.

Thus, if a packet is received directly from the communication partner, the corresponding neighbour table entry can be reactivated immediately.

In another variant of the first aspect which can be combined with all the examples detailed above, the maintaining occurs upon reception of a control message enabling the determination of a link quality with a neighboring node. In this example, control messages may be sent from time to time by all communication nodes in the network to enable their respective neighbouring communication nodes to estimate the link quality. Thus, a communication apparatus in accordance with this embodiment upon reception of such a control message may check whether the neighbouring communication node corresponding to the received control message is communication partner. If it is the case, it has higher priority to enter into the neighbour table, optionally replacing some other entry if the table is full.

In accordance with a second aspect of the invention, it is proposed a communication apparatus comprising a memory including a neighbor table comprising a plurality of neighboring table entries corresponding to respective neighboring nodes, a transmitter for transmitting messages to said plurality of neighboring nodes being communication nodes in communication range of the communication apparatus, a receiver for receiving messages from said plurality of neighboring nodes, a controller adapted to maintain the neighbor table stored in the memory, including, upon determination that the neighbor table capacity has reached a threshold, the controller being adapted to replace a former neighbor table entry corresponding to a former neighboring node from the neighbor table by a new neighbor table entry corresponding to a new neighboring node based on the determination that the new neighboring node is a communication partner, wherein a communication node is defined as communication partner if at least one the following conditions is met:

condition a a message including the communication partner as source address has been received by the communication node, or condition b a message including the communication partner as destination address has been transmitted by the communication node condition c the new neighboring node is defined as a communication partner by configuration.

All the variants of the first aspect of the invention are equally applicable to this second aspect of the invention.

It is to be noted that the first aspect of the invention may be implemented by computer, and thus, another aspect of the invention relates to a computer program product comprising a set of instructions adapted to, when executed by a processing unit, to cause said processing unit to carry out the method of the first aspect of the invention.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein.

DETAILED DESCRIPTION OF THE INVENTION

Figure 1:
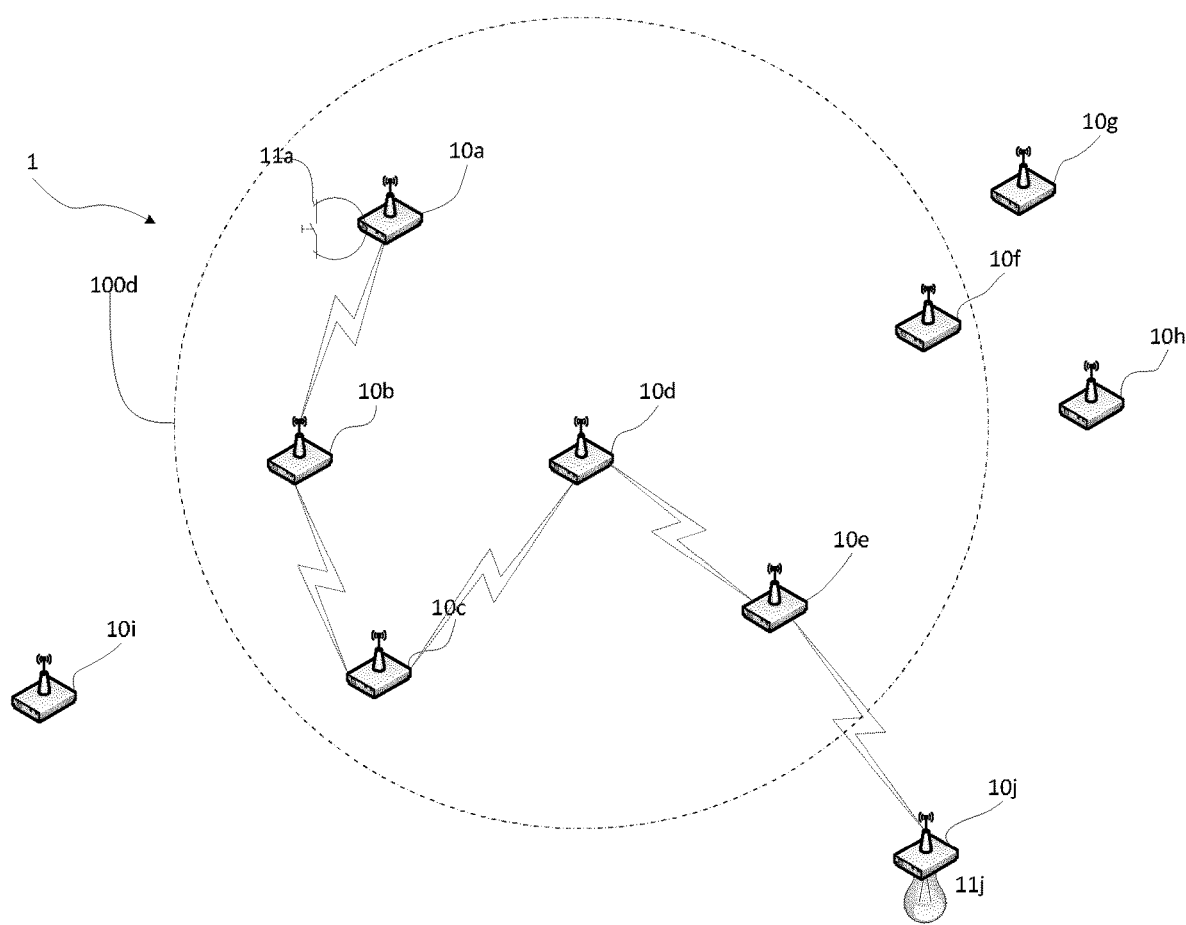
FIG. 1 is a block diagram of a communication network in which an embodiment of the invention is implemented.

The present invention relates to a communication apparatus being used for example in a communication network 1 represented on FIG. 1.

In this communication network 1, a plurality of communication apparatuses forming communication nodes 10a-j are communicating in the network. When a communication node 10a needs to transmit a data message to a distant communication node 10j that is not in range, the data message is forwarded or relayed by forwarding communication nodes. For example, in the case of a data message from communication node 10a to communication 10j, the data message is relayed by communication nodes 10b, then 10c, then 10d, then 10e until it reaches communication node 10j. These communication apparatuses may be used in actuators, for example to control luminaires in a lighting network. Thus, the communication apparatus 10a may be associated with a switch 11a (e.g. a wall switch, a presence sensor, a luminosity detector) to send commands which are received by communication apparatus 10j to control an associated luminaire 11j.

Figure 2:
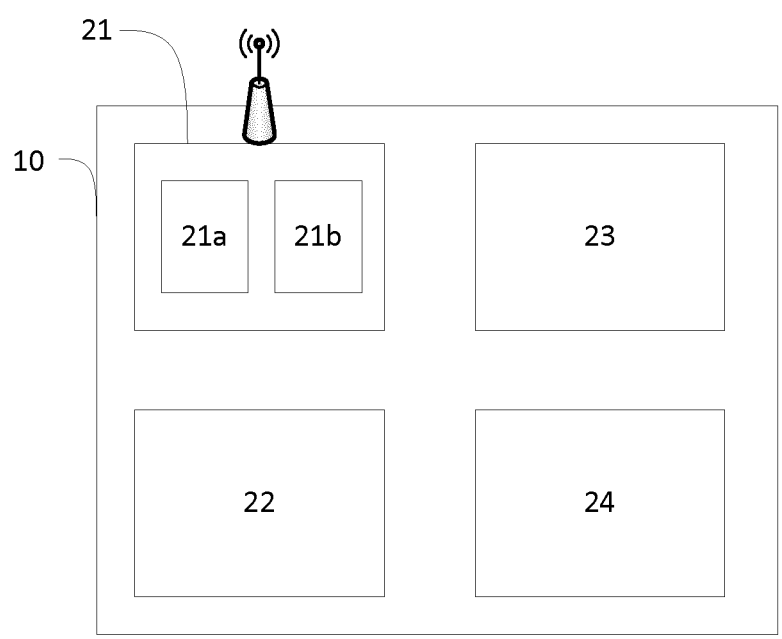
FIG. 2 is a block diagram of a communication apparatus in accordance with an embodiment of the invention.

To assist in this routing, as shown on FIG. 2; a communication apparatus 10 comprises a transceiver 21 including a transmitter 21a and a receiver 21b, for example an RF unit coupled to an antenna, a memory 22 which stores a respective neighbour table and the configuration data relevant for the operation of the transceiver. As explained above, the neighbour table (NBT) is used to keep track of the communication nodes that are in range of the communication apparatus. This neighbour table includes a plurality of neighbour table entries corresponding each respectively to a neighbouring node. A neighbouring node is a communication node that can be reached by a considered communication apparatus within a single communication hop. As an example in FIG. 1, communication node 10a is in range of communication nodes 10b, and 10d and corresponding entries are included in its neighbour table.

As shown on FIG. 2, the communication apparatus 10 also comprises a controller 23 to operate the transceiver 21, in association with the memory 22, for example, a ZigBee® module based on IEEE802.15.4. Further, the communication apparatus can include a measurement unit 24 to carry out some measurements on the control messages to estimate the link quality with other communication nodes.

In an embodiment of the invention, each communication apparatus keeps track of its respective "communication partners", for example in a communication partner list. As specified above, the communication partners can be defined as communication nodes a communication apparatus receives packets from or that it has to send packets to.

In the example of FIG. 1 detailed earlier, the source address is the address of communication node 10a and the destination address is the address corresponding to communication node 10j.

If it happens that one of the "communication partners" is also neighbour it gets precedence for being incorporated into the neighbour table, possibly replacing another node that is not a communicating partner if the neighbour table gets full.

Conversely, a "communication partner" node that already is in the neighbour table will not be replaced by a neighbouring node that is not a communicating partner.

As an example of the first embodiment, the case of communication node 10d will be studied. In view of the range 100d of the communication node 10d, all communication nodes 10a-f can enter into direct communication with this communication node 10d. However, in this example, the neighbour table is limited to four entries. Therefore, if the communication node 10d is not aware of any communication partner, in this example, only the four communication nodes with the best link qualities are listed in the neighbour table, here 10a, 10b, 10c and 10e.

The link quality is in this example estimated at the reception of a special control message that allows the communication 10d to measure some characteristics, for example RSSI. Other characteristics could be used, e.g. SIR, BER or the like. Conversely, the communication node 10d may send at regular interval a kind of beacon or heartbeat message, which is replied by all the overhearing communication nodes, for example with an indication of the link quality they perceived.

Thus, communication node 10d gathers neighbour information this way, e.g. by receiving this link status messages in ZigBee®. These messages are control messages. As soon as a data message arrives (for example a command message), the communication node 10d checks whether the originator is in the neighbour table and if it is it is marked as communication partner. Similarly, as a data packet from the local higher layer is received to be sent out (for example when a switch is being actuated), the destination address is checked for presence of a corresponding neighbour table entry in the neighbour table. If it is, also this destination is marked as communication partner. When further receiving link status messages from neighbours, these communication partners are never removed from the NBT, even if there are neighbours with a better link quality.

In our example, if a data packet originating from communication node 10f is received, communication node 10d determines that communication node 10f is a communication partner. In a first variant of this embodiment, the communication node 10d adds communication node 10f to a communication partner list. Then, if communication node 10d receives a control message from communication node 10f as detailed above, communication node 10d checks the communication partner list and retrieves an entry corresponding to communication node 10f. Then, communication node 10d decides to add communication node 10f into the neighbouring list, which is however full. Thus, it has to replace one which is already present with this entry. In this exemplary embodiment, communication node 10d will select communication node 10a which is not a communication partner of communication node 10d and has the lowest link quality when compared with communication nodes 10b, 10c and 10e. In variant of this embodiment, it can take into account further characteristics like the number of neighbour of each neighbouring communication nodes (to avoid a kind of orphaning).

In another variant of this embodiment, communication node 10d overheard the original transmission from communication node 10f with communication node 10d as destination address. In this case, even if it has not received a control message, communication node 10d directly proceeds with the neighbour table entry replacement as discussed above. This has the benefit of avoiding keeping a communication partner table in each communication node.

In a variant of the invention, if a neighbouring communication node listed in the neighbour table and that also is a communication partner is not being heard of for some time, it is not simply aged out of the neighbour table, but marked as unreachable. In that case, further messages that need to be sent to that node need to go via the normal routing procedure, i.e. being forwarded by intermediate communication node. If, however, a data message is received directly from it, it shall immediately be re-activated in the neighbour table, without having to wait for the control message, for example the link status message.

In a second embodiment, the communication partners of a node are not determined dynamically as above, but are programmed into the node at installation time or later on by a management interface.

Figure 3:
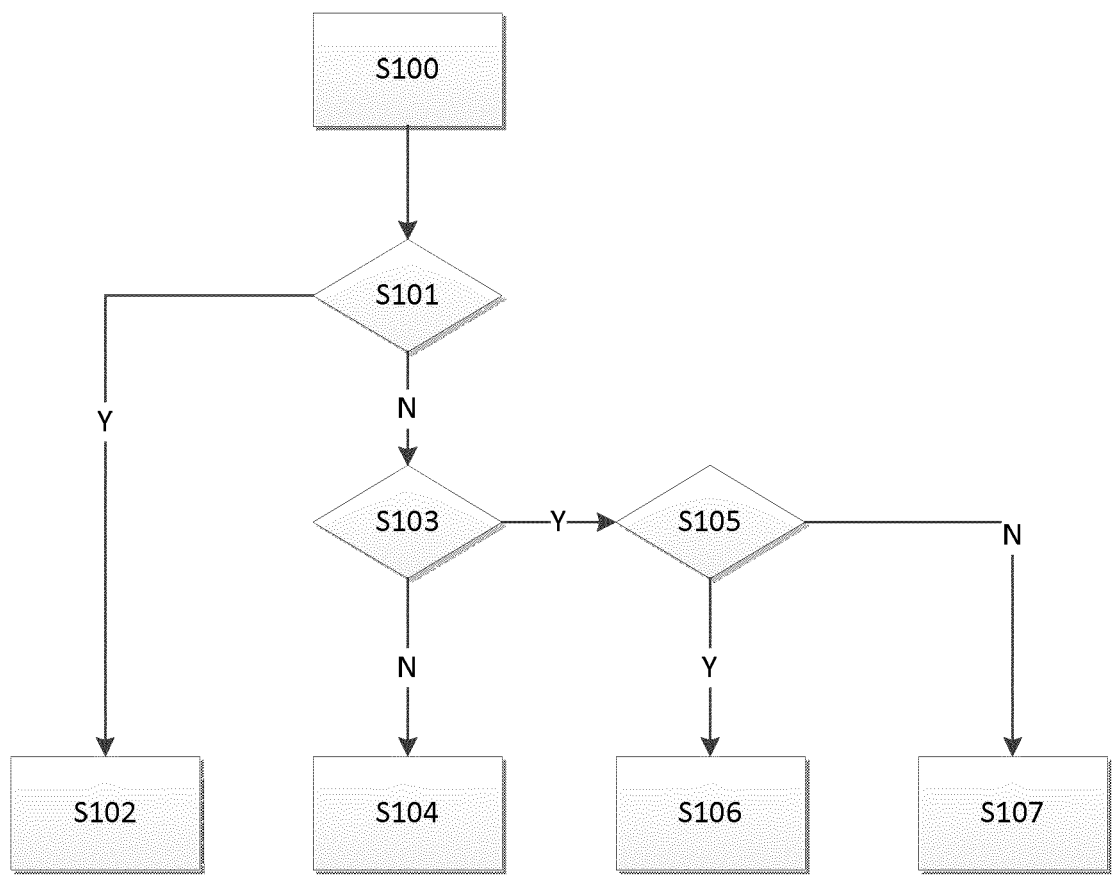
FIG. 3 is a flowchart representing a method in accordance with an embodiment of the invention.

In another aspect of the invention, the method shown on FIG. 3 is now described. As explained above, at step S100, a communication apparatus receives a control message or a data message. At step S101, the communication checks whether this message relates to a communication node that is not in the neighbour table yet, for example:

A link quality message was received corresponding to a new neighbouring communication node that is not in the neighbour table yet, or overhearing a data message that is addressed to this communication apparatus and originating from a communication node that is not in the neighbour table yet.

If the message corresponds to an already present entry of the neighbour table, at step S102, the communication apparatus updates the neighbour table (link quality updated, communication partner flag updated, aging of the entry optionally reset).

If the message corresponds to a potential new entry, the communication apparatus checks at step S103 whether the neighbour table is full. If there is sufficient space in the neighbour table for this new entry, the communication apparatus adds this new entry into the neighbour table at step S104. If, on the contrary, it is determined at step S103 that the neighbour table is full, then the communication apparatus checks whether this potential new entry corresponds to a communication partner at step S105. If it is not the case, at step S106, the replacement is carried out based on the link quality (and/or other parameters) only and compared to other entries not corresponding to a communication partner. If the communication apparatus determined at step S105 that this potential new entry corresponds to a communication partner, then, at step S107, the communication apparatus replaces one of the entries corresponding to a communication node not being a communication partner with this new entry. Preferably, this removed entry corresponds to the non communication partner entry corresponding to the lowest link quality of the neighbour table. Thus, the communication partner entry has a higher priority in the neighbour table. However, if all the entries of the neighbour table correspond to communication partners, it is also possible to replace a communication partner entry from the neighbour table based on other criterion, as an example time elapsed since latest use, frequency of use, link quality.

The embodiments of the invention can be beneficial for large scale wireless networks, where there are only a small number of sender/receiver combinations as is typical for a lighting control installation: many luminaires sending to a single gateway or vice-versa, but no communication among the luminaires themselves.

It is to be noted that the invention allows a modified ZigBee® stack to be still backward compatible with standard ZigBee® devices. Hence interoperability with 3rd party ZigBee® devices will not be jeopardized.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A method of managing a neighbor table in a communication apparatus the method comprising the steps of
the communication apparatus maintaining a neighbor table comprising a plurality of neighboring table entries corresponding to respective neighboring nodes being communication nodes in direct communication range of the communication apparatus,
said maintaining including, upon determination that the neighbor table capacity has reached a threshold, replacing a neighbor table entry corresponding to a neighboring node from the neighbor table by a new neighbor table entry corresponding to a new neighboring node based on the determination that the new neighboring node is a communication partner, wherein a communication node is defined as a communication partner if at least one the following conditions is met:
condition a a message including the communication partner as source address has been received by the communication apparatus, or
condition b a message including the communication partner as destination address has been transmitted by the communication apparatus,
wherein the neighboring node is either not a communication partner of the communication apparatus or is a communication partner with a link quality between the communication apparatus and the neighboring node being lower than a link quality between the communication apparatus and the new neighboring node.

2. The method of claim 1, wherein a communication node is further defined as a communication partner if a condition c is met: the new neighboring node is defined as a communication partner by configuration.

3. The method of claim 1, wherein in condition a, said message includes as destination address the communication apparatus, and in condition b, said message includes as source address the communication apparatus.

4. The method of claim 1, wherein condition c includes preconfiguration at installation or configuration during network operation by a network controller.

5. The method of claim 1, further comprising determining that a validity period of a neighbor table entry is expired, and deleting said neighbor table entry having the expired validity period unless said neighbor table corresponds to a communication partner.

6. The method of claim 5, wherein the communication apparatus keeps the neighbor table entry having the expired validity period of a communication partner in the neighbor table with a flag indicative that the communication partner is unreachable.

7. The method of claim 6, wherein, upon reception of an incoming message from a first communication partner flagged as unreachable, the communication apparatus updates the value of the neighbor table entry corresponding to the first communication partner by removing said flag so that the neighbor table entry is reactivated.

8. The method of claim 1, wherein the maintaining occurs upon reception of a control message enabling the determination of a link quality with a neighboring node.

9. A communication apparatus comprising
a memory including a neighbor table comprising a plurality of neighboring table entries corresponding to respective neighboring nodes,
a transmitter for transmitting messages to said plurality of neighboring nodes being communication nodes in direct communication range of the communication apparatus,
a receiver for receiving messages from said plurality of neighboring nodes,
a controller adapted to maintain the neighbor table stored in the memory, including, upon determination that the neighbor table capacity has reached a threshold, the controller being adapted to replace a neighbor table entry corresponding to a neighboring node from the neighbor table by a new neighbor table entry corresponding to a new neighboring node based on the determination that the new neighboring node is a communication partner, wherein a communication node is defined as communication partner if at least one the following conditions is met:
condition a a message including the communication partner as source address has been received by the communication node, or
condition b a message including the communication partner as destination address has been transmitted by the communication node,
wherein the neighboring node is either not a communication partner of the communication apparatus or is a communication partner with a link quality between the communication apparatus and the neighboring node being lower than a link quality between the communication apparatus and the new neighboring node.

10. The communication apparatus of claim 9, wherein a communication node is further defined as a communication partner if the new neighboring node is defined as a communication partner by configuration.

11. A computer program product comprising a set of instructions adapted to, when executed by a processing unit comprised in a communication apparatus, to cause said communication apparatus to carry out the method of claim 1.

* * * * *